COKING CURVES FOR TWO FLUID CATALYSTS

⊙ 7.5% REY in DB (DB-7)
⊕ 40% REX in DB

July 23, 1968     F. A. SMITH     3,394,075
UTILIZATION OF SUPERACTIVE CATALYSTS CONTAINING RESIDUAL COKE
Filed July 5, 1966

INVENTOR.
Fritz A. Smith
BY
Agent

United States Patent Office 3,394,075
Patented July 23, 1968

3,394,075
UTILIZATION OF SUPERACTIVE CATALYSTS CONTAINING RESIDUAL COKE
Fritz A. Smith, Cherry Hill, N.J., assignor to Mobil Oil Corporation, a corporation of New York
Filed July 5, 1966, Ser. No. 562,672
9 Claims. (Cl. 208—120)

ABSTRACT OF THE DISCLOSURE

The inventive object relates to operating a cyclic process comprising catalytic cracking and regeneration so that relatively high coke burning rates are achievable in the process. This object is made possible by the use of superactive crystalline aluminosilicate containing catalysts which retain catalyst activity and selectivity at relatively high residual coke levels. Therefore, the operation described includes and is particularly directed to maintaining relatively high uniform residual coke levels on regenerated catalyst particles in cooperation with effecting a relatively uniform deposition of coke on the catalyst particles during the conversion step. This control on coke level and deposition permits maintaining a closer temperature control on the individual catalyst particles selected in the system.

---

This invention relates to the conversion of hydrocarbons in the presence of finely divided solid zeolitic catalytic particle material. In a more particular aspect, the present invention is directed to the conversion of hydrocarbons in the presence of catalytic material comprising catalytically modified crystalline zeolites having initial activity and selectivity significantly greater than an amorphous silica-alumina conversion catalyst. In yet another aspect, the present invention is concerned with taking advantage of the activity of a catalytically active aluminosilicate catalyst in a combination of steps comprising a hydrocarbon conversion step and a catalyst regeneration step in a manner not possible heretofore.

It is an object of this invention to provide an improved method for utilizing alumino-silicate conversion catalysts for converting hydrocarbons.

It is another object of this invention to provide a method for converting hydrocarbons with activity modified crystalline alumino-silicate containing catalyst which takes advantage of the catalyst activity in both the regeneration zone and the hydrocarbon conversion zone.

It is a still further object of this invention to provide a regeneration system not commercially practical with an amorphous silica-alumina conversion catalyst made practical with the use of higher activity alumino-silicate containing catalysts in an operation employing residual coke on the alumino-silicate containing catalyst.

Other objects and advantages of the present invention will become more apparent from the following discussion.

In the method and process of this invention, it is contemplated selecting operating parameters in the conversion step which will permit obtaining a desired and relatively uniform deposition of coke on the catalyst particles and in amounts which will permit obtaining desired high coke buring rates and retention of a relatively uniform residual coke level on the catalyst particles. In conjunction with the method of operation of this invention is the finding that catalytically active crystalline aluminosilicate containing cracking catalysts are relatively effective cracking catalysts even with residual coke levels thereon substantially above that permissible with amorphous silica-alumina catalysts without destroying their activity and high selectivity for converting hydrocarbon feeds to desired product. It has also been found that there is an upper limit to the amount of residual coke that can be tolerated before the crystalline aluminosilicate begins to lose its intrinsic selectivity due to unselective effects of residual coke. In addition, by employing relatively low hydrocarbon conversions per pass and maintaining a relatively high hydrocarbon recycle ratio to fresh feed in the conversion step, a high degree of conversion to desired gasoline boiling range products is obtained.

In one embodiment, the present invention relates to employing a crystalline alumino-silicate conversion catalyst having activity above that obtainable with an amorphous silica-alumina catalyst in a hydrocarbon cracking catalyst regeneration system at a residual coke level which will permit realization of significant economies in at least the catalyst regeneration portion of the system without substantially adversely affecting the yield of conversion products boiling in the gasoline boiling range.

In another embodiment, the present invention is concerned with a catalytic operation comprising a catalyst circulating system which permits minimizing the size and catalyst inventory of a cracking regeneration system and also reducing the time the catalyst is required to remain in any one step therein through the mechanism of residual coke on catalyst combined with high coke burning rates. In conjunction with the above, essentially plug flow motion of catalyst solids through the system comprising the cracking zone and regeneration zone is maintained so that at least catalyst particles separated from the regeneration step will retain a desired residual coke level thereon as hereinafter more fully discussed.

In yet another embodiment, the present invention relates to increasing the efficiency of an existing conversion-regeneration system by circulating alumino-silicate containing catalyst particles therethrough at a rate and under conditions which will maintain a substantially higher level of residual coke on the catalyst particles than has been or can be tolerated by an amorphous Si-Al cracking catalyst; passing catalyst particles containing residual coke from the regeneration step in contact with hydrocarbon feed under conditions to effect a relatively uniform deposit of an additional amount of coke thereon in an amount sufficient to permit achieving a greatly accelerated coke burning rate in the regeneration step, regenerating the catalyst at the permissible accelerated coke burning rate under conditions to leave a desired high percentage of residual coke on the catalyst particles and returning the catalyst thus regenerated to the hydrocarbon conversion zone for contact with additional hydrocarbon feed.

In support of the invention herein discussed, the following figures of assembled data are presented:

Figure 7:
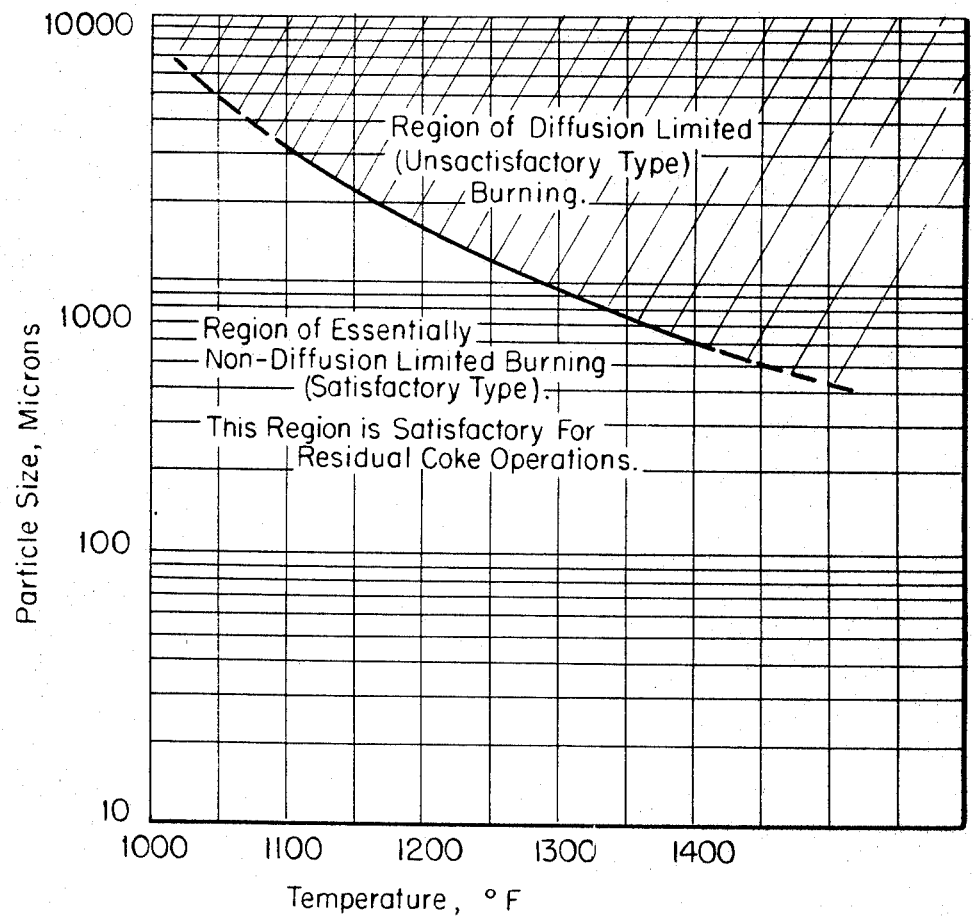

FIGURE 7 presented herewith shows a relationship between catalyst particle size and the approximate maximum temperatures permissible in a regenerator.

Figure 8:
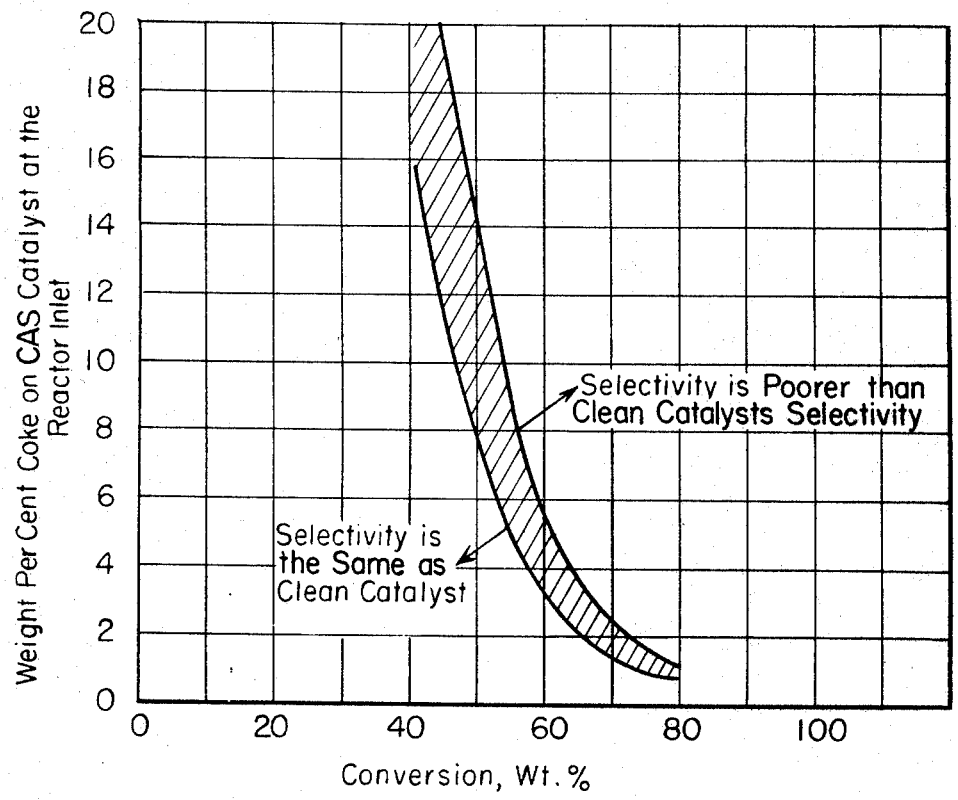

FIGURE 8 presented herewith shows a relationship between residual coke on catalyst and conversion of hydrocarbons when cracking with an aluminosilicate containing catalyst.

Figure 9:
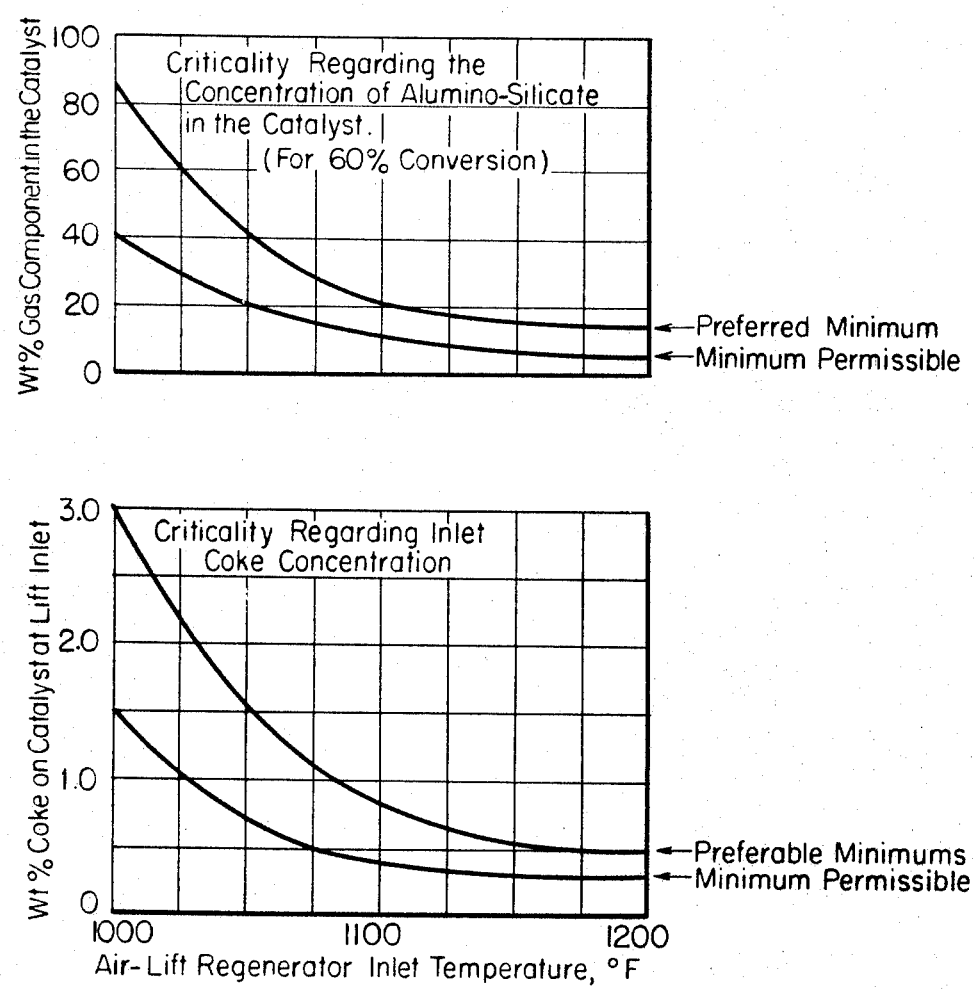

FIGURE 9 presents a group of curves establishing criticalities with respect to regenerator inlet temperatures, weight percent coke on catalyst and weight percent crystalline component on the catalyst.

It has been found in accordance with this invention that it is significantly important to maintain a relatively uniform residual coke level on the catalyst particles and such an objective can be achieved by utilization of a contact system which is essentially plug flow in operation or can be made to substantially duplicate plug flow operations in the reaction and regeneration zones. By plug flow operation is meant the flow of catalyst particles with reactant through a contact zone essentially all in the same direction with little, if any, internal back mixing of catalyst particles within the contact zone. Plug flow catalyst contact systems or systems which may be made to duplicate the operating results thereof may be used to advantage for the reasons herein presented and include for example downwardly flowing catalyst particle systems retained in a confined path either in a dilute or dense phase condition and dilute or dense phase catalyst transfer systems effected in a riser transfer conduit operated under conditions to minimize back flow or back mixing of catalyst particles therein. On the other hand, it is also contemplated employing a plurality of relatively shallow catalyst beds such as relatively shallow dense fluid beds of catalyst maintained for example, as a plurality of separate contact steps in sequence where a relatively uniform amount of coke may be laid down or removed from the catalyst particles. In any event, it is important to the scope of this invention to maintain operating conditions directed to maintaining relatively high instantaneous coke burning rates and retention of a relatively uniform residual coke on catalyst levels so that the regenerator capacity, whatever contact arrangement is employed, can be significantly increased over that normally employed with, for example, an amorphous silica-alumina catalyst. On the other hand, the corollary to the operating technique of this invention for use in existing equipment is to increase the catalyst circulation rate and such an increase permits yet another advantage in the hydrocarbon conversion step by increasing feed rate and/or recycle rate.

It is well known to those skilled in the art that instantaneous coke burning rates are first order reactions with respect to coke concentration on catalysts and therefore doubling the coke concentration, doubles the instantaneous burning rate. For instance, it has been found that the rate of coke burning of catalyst behaves according to the following equation:

$$-\frac{dc_c}{dt} = bC_cC_oe^{-Q/RT}$$

where $t$ = time in seconds;
$T$ = temperature in degrees Kelvin;
$R$ = perfect gas constant of 1.987 calories/mole/degree Kelvin;
$b$ = frequency factor in Arrhnius equation in cc./moles second;
$C_o$ = concentration of oxygen in air at burning site in moles/cc.;
$C_c$ = concentration of coke at burning site in moles/cc.; and
$Q$ = activation energy in B.t.u./lb. mole.

Therefore, increasing $C_c$ will increase the instantaneous burning rate proportionally. It is this scientific finding coupled with the effects of residual coke on selectivity presented herein which leads to the improvements described herein.

It must also be remembered, however, that it is a well known fact that under certain operating conditions, diffusion limited burning of deposited coke can occur in catalyst particles. Catalysts which have been regenerated under such conditions usually contain an inner core of coke, thus, there is a coke gradient across the particle. This coke gradient leads to decreased particle strength and therefore higher attrition rates and also to decreased selectivity. Higher than normal coke levels, such as those suggested herein for residual coke operation will tend toward diffusion limited burning in regenerators. Therefore because of this, limitations must be provided to prevent diffusion limited burning. The limitations are best described by referring to FIGURE 7. FIGURE 7 presented herewith shows the relationship between particle size and the approximate maximum temperatures permissible in the regenerator. As particle size increases the maximum allowable regenerator temperature decreases. Thus for a system employing ⅛" beads (3170 microns) the limiting temperature would be about 1100° F. However, for particles 100 microns or less the temperature limitation is essentially non-restricting. Therefore, within the satisfactory region shown by FIGURE 7, catalyst particles may be regenerated such that residual coke will remain as relatively uniformly dispersed within the catalyst particles.

It becomes evident from the above and the information hereinafter presented that the present invention contemplates maintaining a relatively uniform coke deposit in and among the catalyst particles circulated in a hydrocarbon conversion-catalyst regeneration system and the higher the coke level on the catalyst entering the regeneration zone, the higher the coke burning rate and thus the smaller the regeneration zone. Thus, it becomes evident that a crystalline aluminosilicate containing cracking catalyst can be used to maximum advantage in the simplest of hydrocarbon conversion systems provided a predetermined residual coke level is maintained on the catalyst particles. That is, it is contemplated employing plug flow catalyst reaction and regeneration zones in combination which may be either upflow or downflow contact zones or combinations thereof. In one simplest form of catalyst circulation system, it is contemplated employing more than one hydrocarbon contact step with one or more catalyst regeneration steps arranged in sequence with one another so that a desired control on catalyst coke level can be maintained in accordance with this invention.

In yet another embodiment of the above, it is contemplated modifying an existing TCC hydrocarbon conversion-catalyst regeneration system to a system employing one or more mass flow lift conduits to effect circulation of the catalyst particles in a manner which employs a mass flow lift to regenerate the catalyst thus eliminating the need for the large catalyst regenerator heretofore employed. Such a modification is possible with the zeolite type catalyst contemplated for use in this invention since at relatively rapid coke burning rates attainable by the method of this invention, the catalyst lift conduit may be made adequate for effecting the desired partial regeneration of the catalyst to a relatively uniform desired residual coke level for passage to the hydrocarbon conversion zone. However, in the event that one mass flow lift is inadequate to obtain the desired coke removal or to provide the required regeneration at the coke level existing on the catalyst it is contemplated employing either an additional mass flow lift conduit or a dilute phase lift conduit in sequential flow arrangement for effecting the desired coke removal. In addition, the operation may include by-passing regeneration of the catalyst until the residual coke level has reached a desired level and then pass the catalyst through the regeneration step. This by-pass operation would be particularly useful during start-up of the process.

The mass flow lift discussed above refers to a relatively dense phase condition in which the particles move relatively slowly and a large pressure drop is taken across the lift. Accordingly, either one or both the reactor or regenerator may be employed as a mass flow lift operation.

It is recognized by those knowledgeable in the art that crystalline aluminosilicate catalysts are generally higher activity catalysts than the amorphous silica-alumina catalysts. It is this higher activity which permits applicants to take advantage of residual coke operations without dropping below the activity of amorphous silica-alumina catalysts. Since crystalline aluminosilicate catalysts are most usually diluted or in an amorphous matrix, the overall activity of the catalyst is much lower than that of the pure crystalline alumino-silicate component itself. Therefore to utilize the residual coke concept of this invention, it is important to keep the activity of the catalyst above that attainable with an amorphous silica-alumina catalyst and the activity of such a composite catalyst should have an alpha value >2 and preferably >5. The preferred crystalline alumino-silicate catalysts suitable for use in the method of this invention are particularly the large pore crystalline X and Y faujasites.

It has been found in catalytic cracking operations employing a crystalline alumino-silicate containing catalysts that a reasonable residual coke level need not adversely affect selectivity when the coke level is retained within certain definable limits. However, outside these limits residual coke will adversely affect selectivity. The critical limits of residual coke on catalyst particles can be best defined by reference to FIGURE 8 presented herein. FIGURE 8 shows that as higher conversions are sought, the permissible amount of residual coke on the crystalline alumino-silicate containing catalysts declines. The division between permissible and non-permissible residual coke levels depends to some extent upon the specific chystalline alumino-silicate catalyst employed, operating parameters and charge stock used. For these reasons the limiting residual coke curve of FIGURE 8 is shown as a band or range rather than as a line.

It is readily apparent to those skilled in the art that the addition of a crystalline alumino-silicate catalytic material to a matrix dilutes the crystalline aluminosilicate. Therefore, the permissible coke level is roughly in proportion to the amount of crystalline alumino-silicate material in the matrix. Furthermore, because crystalline aluminosilicate catalysts are usually incorporated in a matrix, the tolerable coke levels are lower for the catalyst mixture than for the aluminosilicate component alone. In general it is believed, however, that the tolerable residual coke level on the total catalyst can be stated as being strictly proportional to the fraction of crystalline zeolite component in the composite catalyst.

It is also to be recognized that a highly uneven distribution of coke among particles is expected to result in a selectivity loss. Therefore, the catalyst flow arrangement selected should be designed so that a relatively even coke distribution is obtained among the catalyst particles in the system. A system which is essentially plug flow in operation will permit attaining the desired relatively uniform coke distribution with greatest ease. However, in a system which permits expensive back mixing of catalyst particles such as in a dense fluid bed operation, the system can be modified with appropriate baffling to inhibit internal cycling to a minimum and be employed in essentially multi-stage arranged so as to more closely approach a plug flow type of operation. However, in any of these systems and arrangements suggested herein it is desirable to maintain the residual coke on individual catalyst particles not substantially more than about 25% deviation from the average level of coke on catalyst. Maintaining such a residual coke band is consistent with the operating technique discussed above in conjunction with FIGURE 8 but distinguishes significantly from a dense fluid bed operation where internal mixing is relied upon for temperature uniformity.

In the method of this invention, it has been found that a relationship exists between the level of residual coke on catalyst and the conversion level one can operate to achieve the benefits of this invention. That is, it has been found when converting hydrocarbon feeds with catalytically active crystalline alumino-silicate containing catalysts that for conversion levels approaching about 65 percent conversion, the residual coke level, meaning the coke level at the inlet to the hydrocarbon conversion step, can be kept up to about 2 wt. percent and possibly as high as about 3.5 wt. percent based on the zeolitic component. On the other hand, at a conversion level of about 55 percent, the residual coke level should not be substantially above about 9 wt. percent and preferably not above about 5 wt. percent and at conversion levels as low as about 50 percent, the residual coke on the zeolitic component of the catalyst may be carried at a level as high as about 8 wt. percent and possibly as high as about 14 wt. percent of the active crystalline alumino-silicate component.

In view of the above, applicant has found that the high activity of the crystalline alumino-silicate conversion catalyst can be effectively dispersed between the hydrocarbon conversion zone and the catalyst regeneration zone. By this, we mean that the high activity conversion catalyst herein described permits taking advantage of the catalyst activity characteristic in the catalyst regeneration steps through the use of relatively high coke burning rates and substantially above that obtainable with an amorphous silica-alumina conversion catalyst. Furthermore, the method of this invention also permits, because of the increased burning rate, the removal by burning of the same amount of coke from the catalyst in a much shorter length of time thereby permiting significant realization in economies of regenerator size, equipment material and method of operation.

As suggested above, operation of the regenerator and the type of regenerator employed should be selected to permit relatively high coke burning rates to a lower desired residual coke level without damage to the catalyst. Furthermore, a substantially uniform residual coke level should be maintained on and among the catalyst particles as discussed above.

In one arrangement discussed above, it is proposed to employ one or more regenerator lift conduits in sequential and/or parallel flow arrangement for conveying spent catalyst recovered from the hydrocarbon conversion step outlet to an elevation suitable for returning regenerated catalyst particles to the inlet of the hydrocarbon conversion steps. In this connection it is proposed to employ substantially any arrangement of contact between solid particle material and regeneration gasiform material whether it be a dense or dilute phase contact operation which will permit relatively rapid removal of a desired but limited amount of carbonaceous deposits from the particles and in a manner which leaves relatively uniform amounts of residual coke on and among the catalyst particles. Therefore, it is proposed to employ regeneration systems which are regarded as substantially plug flow or once through operations with little or no catalyst particle back mixing or which can be made to simulate results achieved by a plug flow type of operation. Accordingly, the regeneration step may be a single upflow or downflow contact step between particle material and gasiform regeneration material or a sequential arrangement of combinations thereof. In yet another embodiment, it is contemplated cascading the catalyst particles through a sequence of relatively very shallow dense fluid bed contact steps which permit substantially uniform removal of carbonaceous material within the limits herein described from the catalyst particles. On the other hand, a catalyst circulation system is contemplated which employs a dilute phase lift regenerator in conjunction with a more dense mass flow contact step for effecting a desired removal of carbonaceous deposits and whether the lift step is before or after the mass flow contact step will generally be a matter of convenience in the system in which employed.

The method of the invention herein described therefore depends in large part upon a hydrocarbon conversion system which permits a relatively uniform deposition of carbonaceous material upon the catalyst particles. Furthermore, the contact system employed should include features and a method of operation which will permit an adjustment of the deposition rate of carbonaceous material is important during at least start-up of the system and in those systems wherein a relatively low catalyst inventory is maintained and circulated. Accordingly, as briefly discussed above, the hydrocarbon conversion step is preferably effected in a plug flow operation which may be either a downflow, upflow or combination thereof and there may be more than one of these arrangements of hydrocarbon contact steps in parallel flow arrangement in association with one of the suitable regeneration systems above described. As suggested above, one simple catalyst circulating system which can be employed to advantage includes a downflow hydrocarbon conversion step, a hydrocarbon product catalyst separation step, a catalyst stripping step, an upflow catalyst regeneration step of the plug flow type discharging into a catalyst accumulation zone and thence a return of regenerated catalyst particles of desired residual coke level to the inlet of the hydrocarbon conversion step.

It is also contemplated in yet another catalyst system of converting a relatively low coke producing feed in at least one plug flow type conversion zone and a relatively high coke producing material in at least one separate plug flow type of conversion zone, catalyst particles containing deposited carbonaceous material recovered from each of the conversion products of the separate conversion zones may be combined and the combined catalyst particles are passed through one or more stages of catalyst plug flow type of regeneration under conditions to reduce the residual coke retained on the catalyst particles within the range hereinbefore discussed and thereafter the residual coke containing catalyst is passed in desired portions to each of said conversion zones.

The invention herein described can also be used to advantage in existing cracking systems since by circulating from about 5 to about 10 wt. percent coke based on crystalline alumino-silicate or sieve component can give substantially as good a selectivity at a conversion level of about 55 percent as if the catalyst circulated had between about zero and 5 wt. percent coke level. It has also been found that the residual coke operations of this invention can be utilized to advantage in existing TCC type of operations provided the content of the alumino-silicate cracking component is increased from current levels of about 5 wt. percent up to at least about 10 wt. percent or higher. A catalyst containing about 15 wt. percent alumino-silicate cracking component will permit a relatively low level (0.2–0.7 wt. percent) residual coke operation in currently existing TCC units. Higher concentrations of aluminosilicate cracking component will permit higher levels of residual coke operation. On the other hand, converting an existing TCC operation to operate with a highly selective REY containing conversion catalyst and resulting in coke on charge of not substantially above about 3% may result in an inadequate kiln size because of kindling problems. Under such conditions a residual coke operation such as herein described could be used to marked advantage to increase burning rates and substantially eliminate the "kindling" problem.

Example

Catalyst particles used in experimental work leading up to this invention were relatively finely divided non-diffusion limited particle material comprising in one case a REY containing crystalline alumino-silicate and in the other case a REX containing crystalline aluminosilicate. The catalysts are defined below:

| Identifying No. | A | B |
|---|---|---|
| Type of aluminosilicate | REY | REX |
| Percent aluminosilicate | 7.5 | 40.0 |
| Percent crystallinity | 4.2 | 22 |
| Steaming conditions: | | |
| Time, hrs | 14 | 4 |
| Temp., °F | 1,400 | 1,400 |
| Press., p.s.i.g | 10 | (¹) |

¹ Atmospheres.

Figure 1:
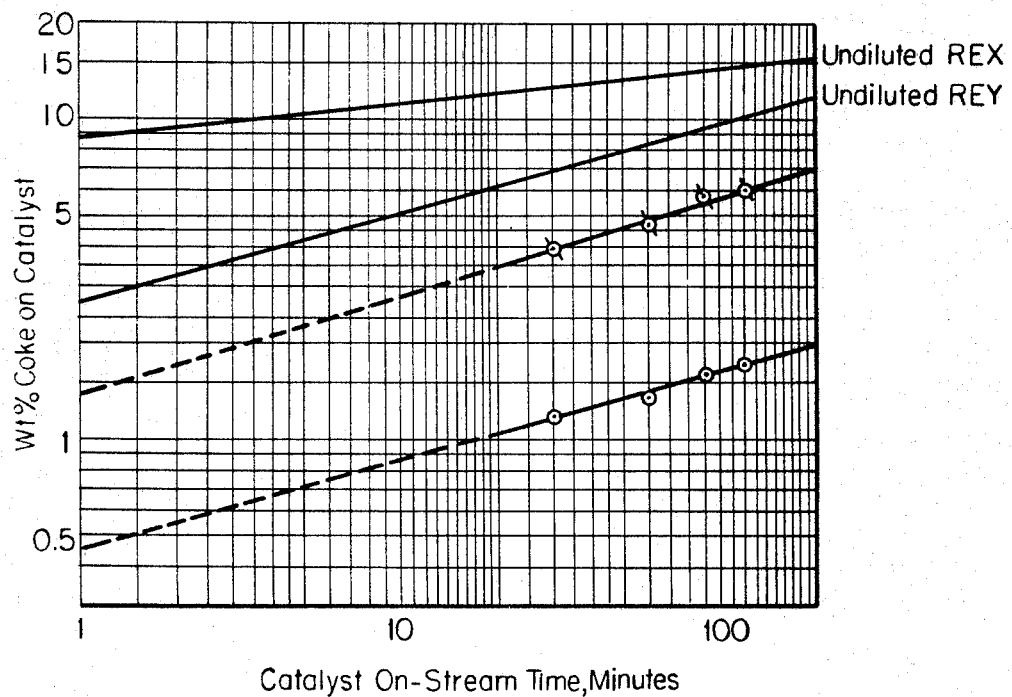
FIGURE 1 is a graph showing the coking curves for two different aluminosilicate containing catalysts and two essentially undiluted aluminosilicate catalysts.

The catalysts above-identified were coked in a "fixed" fluidized bed over a period of about 2 hours using a wide cut Mid-Continent gas oil. Nitrogen was utilized to help fluidize the catalyst and samples of coked catalyst were withdrawn from the bed every half hour for 2 hours and analyzed for coke. The coking data thus obtained were employed to develop the curves of FIGURE 1. Coke concentrations obtained after the two (2) hour contact were 1.7 and 5.9 wt. percent coke respectively for the REY and REX containing catalyst particles. These coke levels thus obtained were regarded as being of a sufficiently high magnitude to be considered as substantially saturation level for the purposes of this invention. A linear plot of the data on FIGURE 1 shows that the coking rates decrease rapidly during the first 10 minutes on-stream time and then become approximately linear between 10 and 120 minutes on-stream time.

In this particular example, portions of the fully coked catalyst A were then regenerated in a muffle furnace at temperatures not substantially above about 1000° F. to provide coked catalyst samples having about 0.22, 0.62 and about 1.3 weight percent coke on the catalysts. One sample of the REX catalyst B having about 2.3 wt. percent residual coke therein was also obtained.

Catalyst samples were tested in a micro-reactor test unit using wide cut Mid-Continent gas oil. Liquid and gas sample conversion products were analyzed chromatographically. The cut point for the $C_5+$ gasoline was determined by first obtaining a chromatogram on the charge stock and using the initial point of this chromatogram as the end point for the $C_5+$ gasolines (initial point for unconverted charge). This cut point occurred just after the dodecane peak (B.P. 421° F.) Most of the selectivity data were obtained at a catalyst on-stream time of about 10 minutes at a temperature of about 900° F. Data were also obtained at about 850 and about 950° F. and at catalyst on-stream times of about 3 and about 6 minutes.

Figure 2:
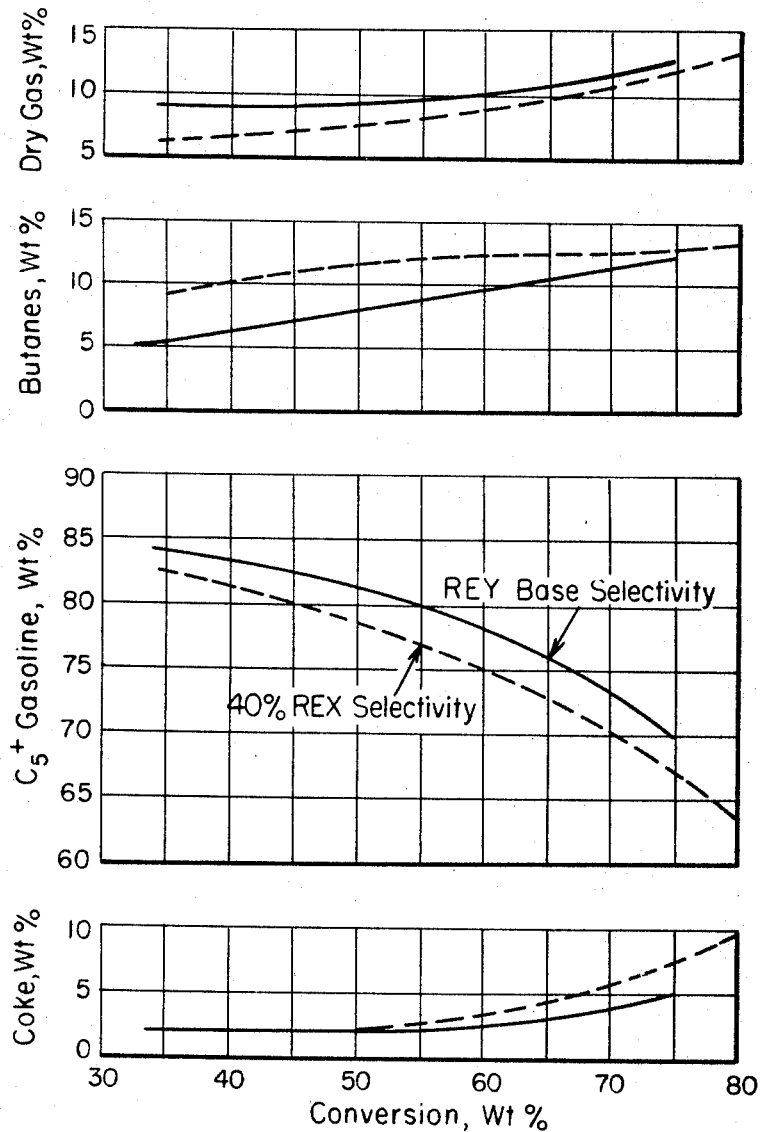
FIGURE 2 is a group of the selectivity data curves obtained in a micro-reactor for two different aluminosilicate containing catalysts of fluidizable particle size.

Four conversion levels between about 35 and about 75 percent conversion were obtained on the fresh REY catalyst which contained no residual precoke. However, several conversion levels were obtained on catalysts which had been precoked and then fully regenerated. These data were employed to obtain the selectivity base-line shown on FIGURE 2. Similarly, four conversion levels between about 35 and about 80 percent conversion were obtained with the 40% REX catalyst above-identified. The selectivity base-line for this catalyst is also shown on FIGURE 2. These selectivity results thus presented were used as the base against which selectivity data obtained on catalyst containing residual coke could be compared. In an effort to develop meaningful comparative selectivity data, a set of three runs were made on the REY catalyst containing about 0.62 wt. percent residual coke. The results obtained at about 3, 6 and about 10 minutes are presented in Table 1. Comparison of the data obtained on coked catalyst at 6 and 10 minutes (Table 1) shows that based on charge somewhat more coke is made at about 6 minutes than at about 10 minutes. It was also observed that the coke make at about 10 minutes on-stream time seems more nearly like the coke make with fresh catalyst after it has been on-stream for about 10 minutes. However, as would be expected, the coke make, based on charge, at about 3 minutes on-stream time is much higher than with the fresh catalyst. Another interesting observation made is that the initial coking rates on these catalysts containing residual coke substantially parallel the initial coking rates on fresh catalyst.

TABLE 1.—EFFECT OF CATALYST ON-STREAM-TIME FOR A DB-7 CATALYST CONTAINING 0.62 WT. PERCENT RESIDUAL COKE
[7.5% REY in DB]

|  |  |  |  | Clean Catalyst Reference Results | |
|---|---|---|---|---|---|
| Catalyst On-Stream-Time, Min. | [1] 3 | 6 | 10 | 10 | 10 |
| Conversion, Wt. Percent | 65.0 | 64.9 | 63.3 | 63.3 | 64.9 |
| Yields, Wt. Percent: | | | | | |
| Dry Gas | 6.9 | 6.7 | 7.7 | 6.7 | 6.9 |
| Butanes | 7.7 | 7.1 | 5.8 | 5.8 | 6.5 |
| $C_5+$ Gasoline | 46.3 | 48.5 | 48.1 | 48.9 | 49.5 |
| Cycle Stock | 35.0 | 35.1 | 36.7 | 36.7 | 35.1 |
| Coke | 4.1 | 2.6 | 1.7 | 1.9 | 2.0 |
|  | 100.0 | 100.0 | 100.0 | 100.0 | 100.0 |

[1] Low recovery, 85%.

Figure 3:
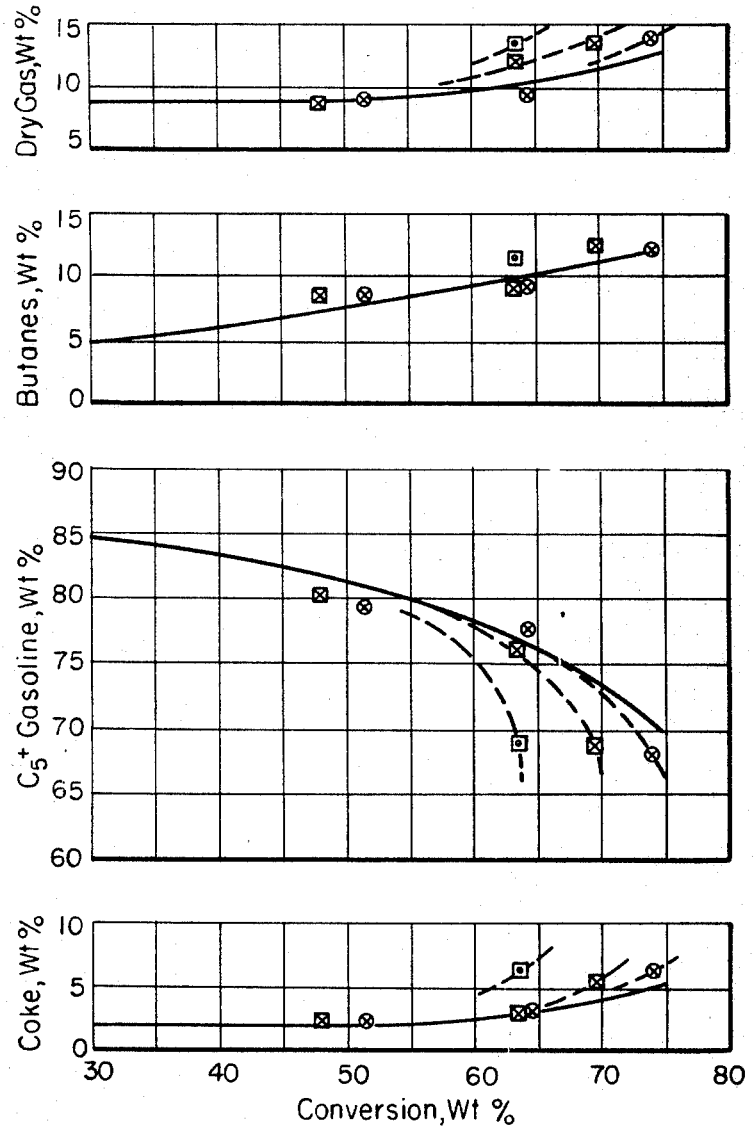
FIGURE 3 is a group of the selectivity data curves obtained for a 7.5% REY (DB-7) catalyst of fluidizable particle size containing residual coke.

The conversion effects obtained with partially regenerated catalyst A containing residual coke levels of about 0.22, 0.62 and about 1.3 wt. percent are presented in FIGURE 3. From FIGURE 3, it can be observed that at conversion levels above about 50%, residual coke on catalyst can have significant adverse effects on selectivity, and the higher the residual coke concentration the greater the adverse effect at a given conversion. However, below a conversion level of about 50% only relatively minor effects are anticipated. An optimistic evaluation of the results presented herein leads one to the conclusion that a cracking system of the plug flow type can be successfully operated with a REY catalyst containing as high as about 1.3 wt. percent total coke or about 11 wt. percent coke based on the active component.

Figure 4:
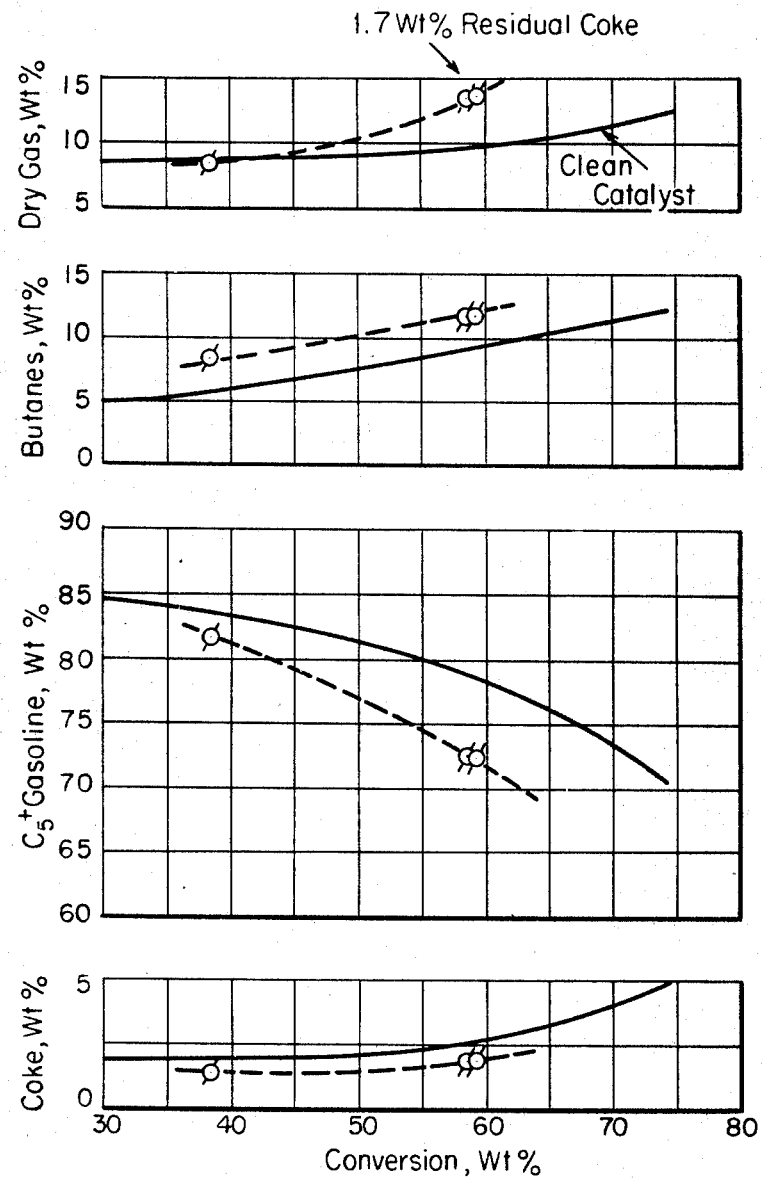
FIGURE 4 is a group of the selectivity data curves obtained with a coked DB-7 catalyst that was not regenerated.

In order to determine the effect of high coke levels on the catalyst, a REY catalyst containing about 1.7 wt. percent residual coke was run at conversion levels of about 38 and about 59%. The catalyst employed in these runs, which had not been subjected to an oxidative atmosphere, was purged in a helium atmosphere while bringing it up to a hydrocarbon conversion or cracking temperature of about 900° F. The selectivity plots presented in FIGURE 4 show that deviation from fresh catalyst selectivity is substantially negligible until a conversion level of about 40% is attained. It is, therefore, evident that the REY catalyst remains selective up to about 40% conversion even when about fully loaded with coke.

Figure 5:
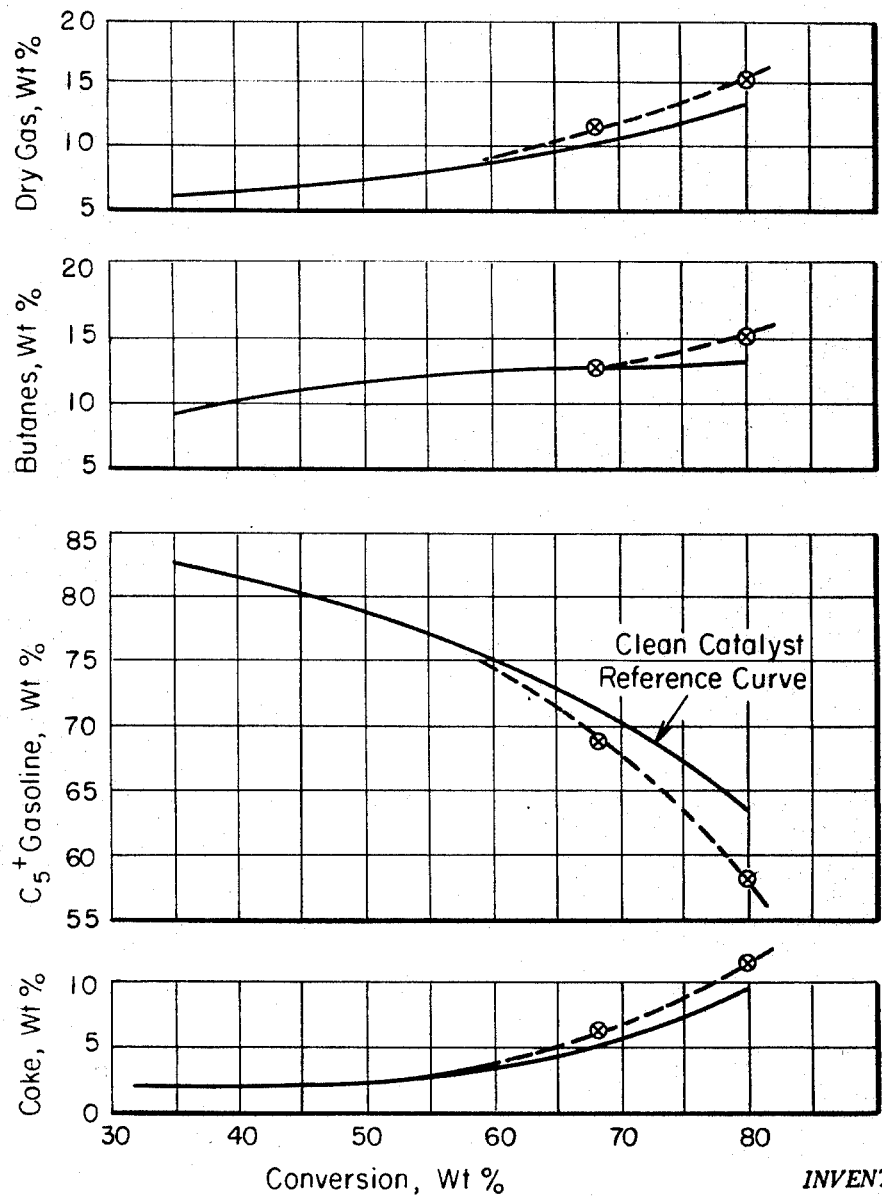
FIGURE 5 is a group of the selectivity data curves obtained for a 40% REX in Durabead catalyst of fluidizable particle size containing 2.3 weight percent coke.

The selectivity of partially regenerated catalyst comprising 40% REX and containing a total residual coke level of about 2.3 wt. percent, about 6 wt. percent on aluminosilicate, were determined and the data obtained used to develop the curves of FIGURE 5. Extrapolation of the data of FIGURE 5 leads to the conclusion that a residual coke level as high as about 2.3 wt. percent on the total catalyst, or about 6 wt. percent on the active component, does not begin to have an adverse effect until the conversion level exceeds about 60%.

Figure 6:
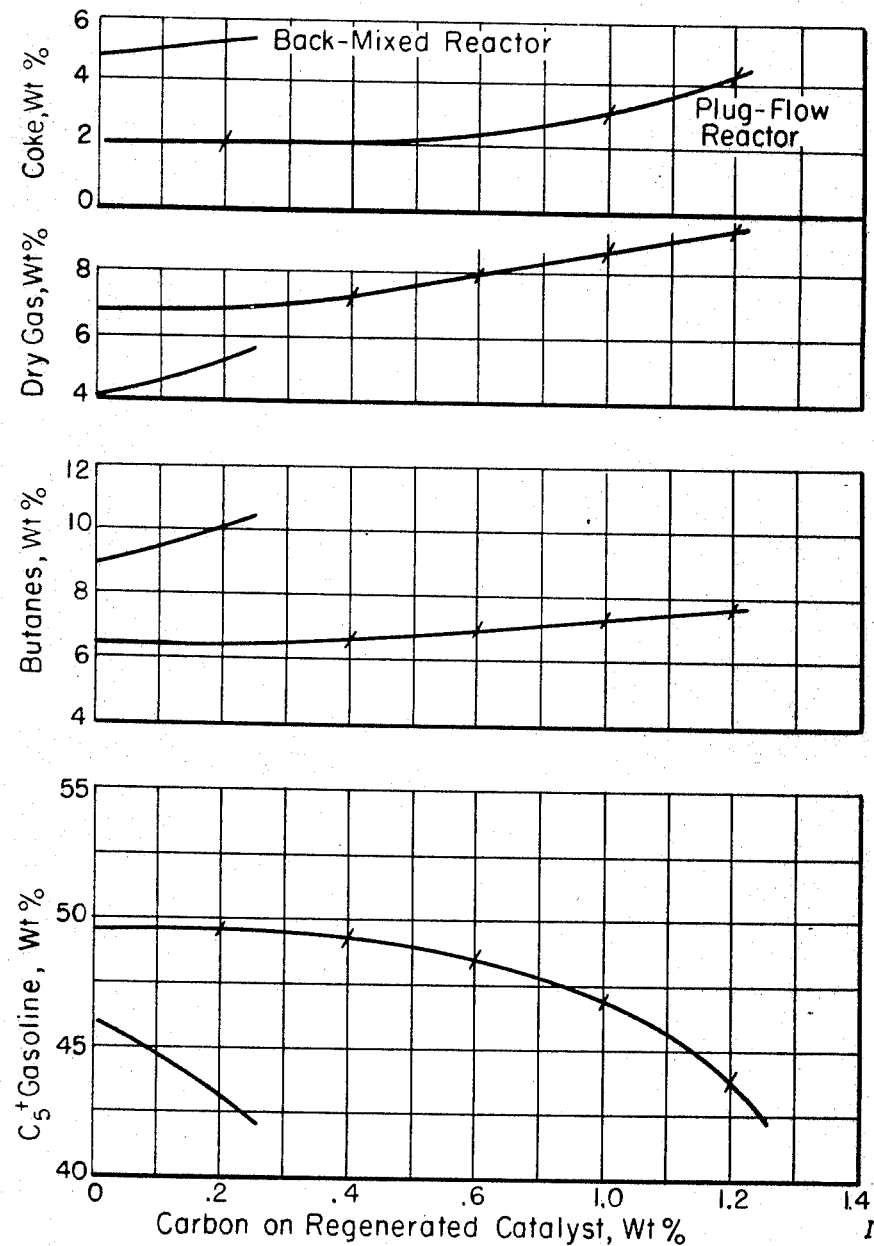
FIGURE 6 is a group of selectivity curves showing a comparison in results obtained between back-mixed and plug flow operations.

In FIGURE 6 a family of curves is shown for drawing a comparison between the results obtainable in an operation wherein catalyst backmixing is experienced and one of a plug flow type of operation wherein catalyst backmixing is avoided. This family of comparative curves is essentially self-explanatory in showing a much greater rate in loss of selectivity for the back mixed system and also shows the significant improvements obtainable with a plug flow type of operation.

As further examples of the improved results obtainable by the method and process of the invention herein described the following are presented:

Example I

A number of catalyst kilns, or regeneration arrangements that cannot be considered for commercialization with amorphous silica-alumina catalysts due to their poor economics can be considered when a residual coke operation of the type described above is employed. One such system which has been analyzed is an air-lift type regenerator. It has been found that dilute phase air-lift type regenerators are commercially practical if conditons to the lift are maintained substantially as follows:

Inlet conditions:
    Concentration of alumino-silicate component in the catalyst _____ As defined on Figure 9.
    Coke on catalyst, wt. percent _____ As defined on Figure 9.
    Catalyst temp., ° F. _____ ≥1000 but preferably ≥1025.
    Air Temp., ° F. _____ ≥400 but preferably ≥600.
    Pressure, p.s.i.a. _____ ≥30 but preferably ≥35.
    Particle size, microns ____ ≤2000 but preferably ≤1000.
Outlet conditions:
    Coke on catalyst, wt. percent _____ Ranges from 99% to 25% of the inlet coke concentration, but preferably from 99% to 50% of the inlet coke concentration.

Within the above limits a catalyst which contains about 10% or greater REX or REY in a silica-alumina matrix can be utilized in a lift cracking-regeneration system operating at a 60% conversion level at a lift regenerator inlet temperature of about 1100° F. with substantially the same selectivity as obtainable with a pure REX or REY catalyst with no residual coke left on the catalyst at the end of the regeneration cycle. FIGURE 9 demonstrates two criticalities in regard to dilute phase lift regeneration systems using alumino-silicate containing catalysts. One is that lower concentrations of CAS component are required in the catalyst as the inlet temperature to the air life regenerator increases; the other is that the inlet coke concentrations required on the catalyst also decreases with increasing inlet temperature.

Example 2

The well known commercially used TCC kiln has a volumetric burning capacity on the order of about 0.8 to about 2.5 pounds of coke per hour per cubic foot. For comparison the results computed for several air lift systems, along with their operating conditions, are shown below.

| Height of Lift, Ft. | 100 | 100 | 100 |
|---|---|---|---|
| Inlet Conditions: | | | |
| Coke on Catalyst, Wt. Percent | 0.5 | 3.0 | 5.0 |
| Catalyst Temperature, ° F | 1,000 | 1,000 | 1,000 |
| Air Temperature, ° F | 1,000 | 1,000 | 1,000 |
| Pressure, p.s.i.a. | 35 | 35 | 35 |
| Particle Size, microns | 100 | 100 | 100 |
| Outlet Conditions, Coke on Catalyst, Wt. Percent | 0.49 | 2.9 | 4.9 |
| Volumetric Burning Capacity, lbs./hr.-ft.³ | ~0.1 | ~1.1 | ~1.9 |

The results shown in the first column demonstrate that catalysts with low inlet coke levels do not provide sufficiently high volumetric burning capacities and consequently lift regenerators operated at such coke levels are not desirable. The second two columns demonstrate that lift regenerators are feasible however, at higher inlet coke levels and that the lift regenerator lengths need not be excessive if sufficient residual coke is left on the catalyst.

It should be noted that the *instantaneous* burning rates for the lift systems shown are much greater than the instanseous burning rates of the TCC system, but the volumetric burning capacities of the lift systems are no greater than that of the TCC system. This is in effect an example of how the residual coke concept can make an otherwise impractical system one that is desirable.

Example 3

A highly desirable lift regenerator system employing multiple lifts in series is shown in the table below:

| Lift Number | 1 | 2 | 3 | 4 |
|---|---|---|---|---|
| Lift Height, ft | 100 | 100 | 100 | 100 |
| Inlet Conditions to Individual Lift: | | | | |
| Coke on Catalyst, Wt. Percent | 2.0 | 1.95 | 1.86 | 1.71 |
| Catalyst Temp., °F | 1,000 | 1,037 | 1,084 | 1,164 |
| Air Temp., °F | 1,400 | 1,400 | 1,400 | 1,400 |
| Pressure, p.s.i.g | 35 | 35 | 35 | 35 |
| Particle Size, microns | 100 | 100 | 100 | 100 |
| Volumetric Burning Capacity, lbs./hr.-ft.³ | | | | |
| Individual Lift | 0.7 | 1.2 | 2.1 | 3.4 |
| Total | 0.7 | 1.0 | 1.4 | 1.9 |
| Final Coke on Catalyst, Wt. Percent | | | | 1.2 |

The above example demonstrates that by using multiple lifts in series desirable high volumetric burning volumes can be attained. Therefore, lift regenerator systems which heretofore could not be considered for commercial applications can now be considered provided substantial quantities of residual coke is left on the aluminosilicate containing catalyst.

Example 4

It has been demonstrated that the kiln burning volume requirements can be greatly reduced by employing a residual coke operation. A comparison between the complete burn-off and a residual coke system is shown below:

| | Complete Burn-off System | Residual Coke System |
|---|---|---|
| Inlet Coke Content, Wt. Percent | 0.576 | 1.00 |
| Outlet Coke Content, Wt. Percent | 0.026 | 0.50 |
| Pounds Coke Burned, lb./hr | 6,000 | 6,000 |
| Burning Volume Requirement, ft.³ | 13,000 | 5,700 |

These results show that for highly selective crystalline alumino-silicate catalysts which make less coke than amorphous silica-alumina catalyst based on charge stock that a substantial savings in kiln volume requirements can be made by designing for a residual coke operation.

It is evident from the data obtained and presented herein that for any given crystalline aluminosilicate containing catalyst the maximum permissible residual coke level for a given conversion level can be related to the coke laydown obtainable during an equivalent precoking time period. Thus by use of FIGURES 1 and 8 it can be demonstrated that the coke level which can be obtained by precoking catalyst A over a three minute period, conversion levels of from about 50% to about 55% can be attained without substantially deviating from clean catalyst selectivity. To attain higher conversion levels with no deviation from clean catalyst selectivity equivalent coke levels and time periods must decrease. That is, precoking or operating with residual coke on catalyst will not adversely affect selectivity below certain definable conversion levels.

A comparison of gasoline selectivities was also made between data obtained in a plug-flow micro reactor and a back-mixed fluid pilot plant. For this comparison a DB-7 catalyst (7.5 wt. percent REY aluminosilicate) was used in the plug-flow reactor experiments and a DB-5 catalyst (7.5 wt. percent REX aluminosilicate) was used in the fluid pilot plant experiments. In the plug-flow case there was no significant loss in gasoline selectivity at a conversion level of 65% as the residual coke level increased from about 0.1 to 0.2 wt. percent. In a back-mixed catalyst case such as a dense fluid bed type operation (FCC) gasoline selectivity decreased 1.6 wt. percent at the 65% conversion level as residual coke increased from 0.1 to 0.2 wt. percent. In FCC dense fluid bed catalytic cracking operations, it is well known that coke content varies greatly from particle to particle and now it has been shown above that this is detrimental to gasoline selectivity when using alumino-silicate catalysts in this cracking process. Consequently, it can be predicted that any method which decreases non-uniform coke dispersion in FCC operation will increase gasoline selectivity and make the process more economical.

Having thus provided a general discussion of the improved method and process of this invention and presented numerous examples in support thereof, it is to be understood that no undue restrictions are to be imposed by reasons thereof except as defined in the following claims.

I claim:

1. A method for converting a hydrocarbon feed to lower boiling products including gasoline and regeneration of catalyst employed therein which comprises causing a catalytically active aluminosilicate containing catalyst to move sequentially through a conversion zone to a regeneration zone and thence back to said conversion zone under conditions to minimize any significant back mixing of catalyst particles in said respective zones, depositing hydrocarbonaceous material on said catalyst particles in said conversion zone, removing a portion of the deposited hydrocarbonaceous material from the catalyst particles in said regeneration zone, the balance between deposited and removed hydrocarbonaceous material on the catalyst particles being sufficient to obtain relatively high coke burning rates of at least 1 lb./hr.-ft.³ in said regeneration zone and passing catalyst particles having a relatively uniform residual coke level thereon and having a value adjacent the bottom edge of the curve of FIGURE 8 to said conversion zone at an elevated conversion temperature.

2. A method of converting hydrocarbons which comprises causing catalyst particles of non-diffusion limited coke burning size to flow through a hydrocarbon conversion zone under conditions permitting relatively uniform deposition of carbonaceous material upon catalyst particles in said conversion zone, partially removing deposited carbonaceous material from the catalyst particles in a regeneration zone under conditions to retain a relatively uniform residual coke level associated with the catalyst particles, and the amount of deposited coke removed from and retained with the catalyst particles being sufficient to maintain high instantaneous coke burning rates in said regeneration zone and an overall volumetric burning capacity of at least about 1 lb./hr.-ft.³.

3. The method for improving the operation of a process for the conversion of hydrocarbon feed materials to lower boiling products including gasoline which comprises causing catalytically active crystalline aluminosilicate containing catalyst particles comprising REX or REY of at least $5\alpha$ activity to move through a hydrocarbon conversion zone under conditions to effect deposition of carbonaceous material on the catalyst particles relatively uniformly and removing deposited carbonaceous material from the catalyst in a regeneration zone under instantaneous coke burning rates of at least 3 lbs./hr.-ft.³ and retain a substantially uniform residual coke level on the catalyst particles, and controlling the amount of residual coke retained on the catalyst particles used for effecting the conversion of hydrocarbon at the maximum residual coke limit preventing selectivity losses as represented by FIGURE 8 for conversion levels in the range of 40 to 80 percent.

4. The method of claim 2 wherein the catalyst flows through the hydrocarbon conversion and regeneration zone as a relatively dilute suspension in gasiform material and the regenerator inlet temperature is maintained at least about 1100° F.

5. The method of claim 2 wherein the catalyst flows through the hydrocarbon conversion and regeneration zone as a relatively dense phase of catalyst particles with the reactant material.

6. The method of claim 2 wherein the catalyst is employed in a relatively dense phase condition in one of the contact zones and in a relatively dilute phase condition in the other of the contact zones.

7. The method of utilizing the high activity of a crystalline aluminosilicate catalyst of fluidizable particle size which comprises passing a high activity crystalline aluminosilicate catalyst comprising REX or REY through a hydrocarbon conversion zone, a catalyst regeneration zone and recycle to said conversion zone at a residual coke on catalyst level sufficiently elevated to permit an overall volumetric coke burning capacity of at least 1 lb./hr.-ft.$^3$ in said regeneration zone; maintaining the coke level on individual catalyst particles not more than about 25% deviation from the average level of coke on catalyst and maintaining the residual coke limit on the catalyst passed to said conversion zone which prevent selectivity losses within the critical limits defined by FIGURE 8.

8. A method for cracking hydrocarbons with a high activity crystalline aluminosilicate cracking catalyst comprising REX or REY of at least $2\alpha$ activity which comprises passing high activity crystalline aluminosilicate cracking catalyst through a cracking zone and a catalyst regeneration zone, maintaining sufficient residual coke on the catalyst withdrawn from the regeneration zone in combination with the amount deposited on the catalyst in the cracking zone sufficient to attain a volumetric coke burning capacity of at least 3 lbs./hr.-ft.$^3$ in said regeneration zone, and limiting the conversion level in the cracking zone as a function of retained residual coke on catalyst so that the selectivity obtained during conversion will be substantially equivalent to that attainable with a catalyst containing substantially no residual coke thereon as represented by FIGURE 8 in a conversion range of 40 to 80 percent.

9. The method of claim 8 wherein the regenerator operating criticalities are maintained within the preferred minimum defined by FIGURE 9.

References Cited
UNITED STATES PATENTS

| | | | |
|---|---|---|---|
| 3,206,393 | 9/1965 | Pohlenz | 208—164 |
| 3,255,103 | 6/1966 | Fahnestock | 208—165 |

DELBERT E. GANTZ, *Primary Examiner.*

ABRAHAM RIMENS, *Assistant Examiner.*

UNITED STATES PATENT OFFICE
CERTIFICATE OF CORRECTION

Patent No. 3,394,075                                          July 23, 1968

Fritz A. Smith

It is certified that error appears in the above identified patent and that said Letters Patent are hereby corrected as shown below:

Column 7, line 8, before "is" insert -- terial upon the catalyst being circulated. This adjustment --; line 12, "uow" should read -- flow --. Column 8, line 20, "5.9" should read -- 5.96 --. Column 11, in the table, fourth column, line 3 thereof, "1,084" should read -- 1,087 --.

Signed and sealed this 23rd day of December 1969.

(SEAL)
Attest:

Edward M. Fletcher, Jr.                          WILLIAM E. SCHUYLER, JR.
Attesting Officer                                      Commissioner of Patents